(No Model.)

J. WATTERS.
VEHICLE CURTAIN FASTENER.

No. 436,962.        Patented Sept. 23, 1890.

WITNESSES
H. M. Plaisted,
Warren Hull,

INVENTOR
John Watters,
By H. A. Toulmin,
His Attorney.

UNITED STATES PATENT OFFICE.

JOHN WATTERS, OF SPRINGFIELD, OHIO.

VEHICLE-CURTAIN FASTENER.

SPECIFICATION forming part of Letters Patent No. 436,962, dated September 23, 1890.

Application filed October 2, 1889. Serial No. 325,803. (No model.)

*To all whom it may concern:*

Be it known that I, JOHN WATTERS, a citizen of the United States, residing at Springfield, in the county of Clark and State of Ohio, have invented certain new and useful Improvements in Vehicle-Curtain Fasteners, of which the following is a specification, reference being had therein to the accompanying drawings.

This invention relates to certain new and useful improvements in vehicle-curtain fasteners, and the object is to provide a simple and inexpensive but strong device for attaching vehicle-curtains to the top-posts or to each other by overlapping one upon the other.

Figure 2:
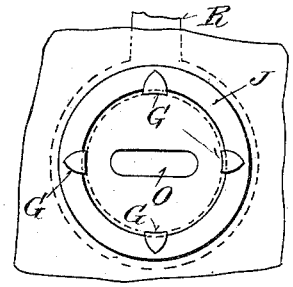
Figure 5:
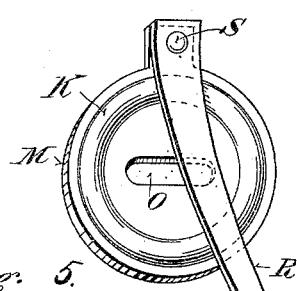
Figure 3:
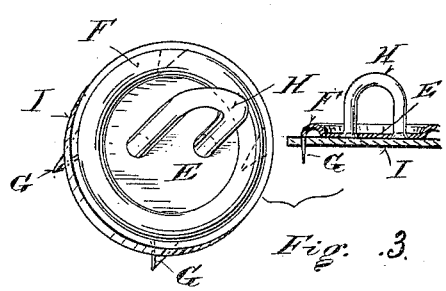
Figures 1, 4, 6:
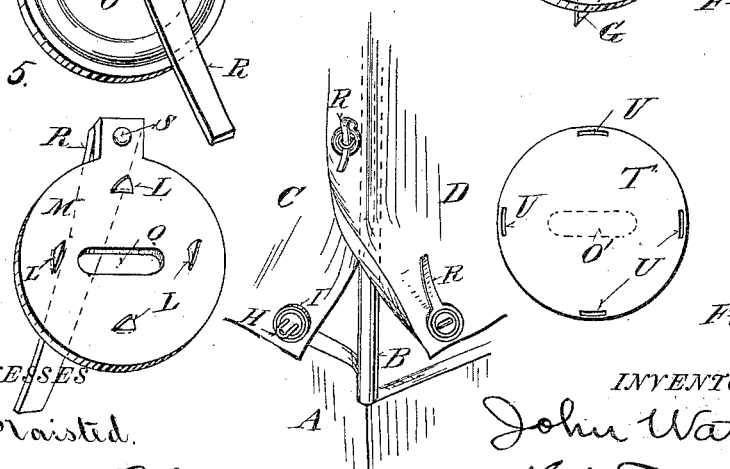

In the accompanying drawings, forming a part of this specification, and in which like reference-letters indicate corresponding parts, Figure 1 represents a perspective view of the rear corner of a vehicle seat and top post, showing the back and side curtains and the means for fastening them together; Fig. 2, a rear or inside view showing the means for attaching the male member to the curtain; Fig. 3, a detached perspective view of the female member applicable for attachment to a curtain; Fig. 4, a detail view of the back ring or plate; Fig. 5, a detail perspective view of the male member with a modified form of tongue, and Fig. 6 a rear view of the form shown in Fig. 5.

The letter A designates a portion of a vehicle seat or body, the letter B a top-post thereof, and the letters C and D back and side curtains, respectively.

Two forms of devices are to be used to constitute the female member of this device, one of which is to be secured to the underlapped curtain and the other of which to the top-posts. I will first describe the invention in connection with the first form of female member. This consists of a disk E, preferably struck up of sheet metal and provided with an annular bead F, to afford additional strength. It is also provided with integral tangs or projections G for the attachment to the curtain. A staple H is riveted or otherwise secured to the disk E, and is arranged to receive the tongue of the male member of the device, as shown in Fig. 1. A disk or patch I, of leather, is interposed between the disk E and the curtain to prevent the rust which forms around the edge of the disk or its bead F (if it be formed with a bead) from reaching the curtain, and which is found in practice to rapidly rot out and eat into the curtain, destroying it, and causing the disk to tear away from the curtain. The presence of the leather disk or patch avoids this destruction of the curtain, as the action of the rust upon the leather is resisted by the naturally oily or greasy condition of the leather. By preference a ring J, of metal or other material, is placed on the inside of the curtain with the projections G clinched over it, an illustration of which arrangement is shown in Fig. 2.

Referring now to the curtain D and the male member of the device, the letter K designates an annulus, preferably struck up of sheet metal and having tangs or projections L, similar to those shown at G, which are projected through a leather disk or patch M, similar to that shown at I, and then through the curtain and clinched down over the ring J, as seen in Fig. 2. Thus the male member of the device is secured to the overlapping curtain. The leather disk or patch M is slotted at O to receive the staple H. The said disk or patch M is further provided with a tongue R, which is either integral with it or made of a separate piece and riveted or otherwise secured thereto, as suggested at S in Figs. 5 and 6.

It will be seen by reference to Fig. 1 that the curtain carrying the female member of the device is overlapped by the curtain carrying the said male member, and that the tongue R is projected through the staple H. This forms an easily fastened and unfastened connecting device. The common way of fastening overlapped edges of vehicle-curtains is by means of the ordinary buckle and strap, a more cumbersome device and inferior to mine in point of neatness and easy manipulation.

It will be observed that the metallic part of the male member, which is on the outside of the curtain and exposed to the weather, is separated from the curtain by the interposition of the leather disk or patch. I prefer to make this disk or patch of leather; but any other material capable of resisting the action of rust will answer the purpose, in which case the tongue R will be suitably secured.

In Fig. 8 I have illustrated a modification of the back ring J, the same consisting of a plate T, slotted at U to receive the tangs or projections G or L, as the case may be.

It is preferred that the annulus K be rounded in cross-section, being similar to the bead F, as shown in Fig. 3.

I am aware that it is not new to connect a leather tongue with a vehicle-curtain by means of a metallic plate which is clinched to the curtain and arranged with a recess between it and the curtain to receive and hold the tongue, which parts are used in connection with an eyebolt secured to the wagon-body and projected through a slot in one of the curtains and arranged to receive the tongue, as such combination is shown in Letters Patent granted to John Watters (myself) and Charles Schuessler, December 18, 1877, No. 198,252, for wagon-curtain fasteners. I am also aware that it is old to secure a leather tongue having a disk-shaped end to a vehicle-curtain by a metallic annulus, and to provide in this connection an eye or staple projecting from a post of the vehicle-top and through a slot in the curtain and disk part of the tongue, the eye or staple being arranged to receive the tongue. In both of these devices, however, that feature of my invention and of my claims which refers to a disk secured to the overlapped curtain and to a staple or female device carried by said disk is absent. In the devices referred to the female device (the staple or eye) is not carried by a curtain, but is fixed, being secured to the body or to a post of the top. In my case the curtain carries this female device, (staple or eye,) and the curtains are fastened one to the other and not to a fixed part. Aside from these features are those of the rust-resisting disk or patch, the annulus outside of which the patch extends, the tongue, and the curtain being a structural arrangement of one part of the device. These features are wholly absent from the devices referred to, since neither of them employs this rust-resisting disk or patch extending beyond the outside of the annulus.

Having thus fully described my invention, what I claim as new, and desire to secure by Letters Patent, is—

1. The combination, with a metallic disk E, having an annular integral bead F, tangs projecting from the bead, a staple H, secured thereto, and an underlapped vehicle-curtain to which the annulus is secured by said tangs, of a disk or patch M, carrying a tongue R, an annulus K, fitted upon the disk or patch and having tangs, and an overlapped vehicle-curtain having a slot to receive said staple H, and to which the annulus is secured by said tangs.

2. The combination, with a leather disk I, a metallic disk E, fitted upon the leather disk, a staple H, secured to the metallic disk, an annular bead F, struck up on the disk E and having tangs, and an underlapped vehicle-curtain through which said tangs are fastened, of a leather disk or patch M, having a slot O, carrying a tongue R, an annulus K, fitted upon the disk M and having tangs, and an overlapped vehicle-curtain placed next to the leather disk M and secured by said latter tangs.

In testimony whereof I affix my signature in presence of two witnesses.

JOHN WATTERS.

Witnesses:
HENRY EPPERT,
RANDOLPH COLEMAN.